(12) United States Patent
Gampe

(10) Patent No.: US 7,712,227 B2
(45) Date of Patent: May 11, 2010

(54) CARRIAGE ARRANGEMENT FOR A MACHINE TOOL

(75) Inventor: Uwe Gampe, Neubiberg (DE)

(73) Assignee: The Gleason Works, Rochester, NY (US)

( * ) Notice: Subject to any disclaimer, the term of this patent is extended or adjusted under 35 U.S.C. 154(b) by 66 days.

(21) Appl. No.: 12/231,927

(22) Filed: Sep. 8, 2008

(65) Prior Publication Data

US 2009/0072117 A1   Mar. 19, 2009

(30) Foreign Application Priority Data

Sep. 14, 2007   (DE) .................. 20 2007 012 868 U

(51) Int. Cl.
*G01B 5/00* (2006.01)
(52) U.S. Cl. .......................... 33/642; 33/1 M
(58) Field of Classification Search .................. 33/642, 33/1 M
See application file for complete search history.

(56) References Cited

U.S. PATENT DOCUMENTS

| | | | | |
|---|---|---|---|---|
| 4,879,916 A | * | 11/1989 | Juillerat ...................... 73/865.8 |
| 5,083,379 A | * | 1/1992 | Enderle et al. ................. 33/556 |
| 5,273,717 A | * | 12/1993 | Marvin ....................... 422/100 |
| 5,357,684 A | * | 10/1994 | Lindner et al. ................. 33/559 |
| 5,746,003 A | * | 5/1998 | Baruchello ................... 33/542 |
| 6,158,136 A | * | 12/2000 | Gotz et al. .................... 33/503 |
| 7,036,239 B2 | * | 5/2006 | Jordil et al. ................... 33/561 |
| 7,086,170 B2 | * | 8/2006 | Hajdukiewicz et al. ........ 33/558 |
| 7,100,297 B2 | * | 9/2006 | McMurtry et al. ............. 33/556 |
| 7,412,776 B2 | * | 8/2008 | Iikubo et al. .................. 33/503 |
| 7,591,078 B2 | * | 9/2009 | Crampton .................... 33/503 |

* cited by examiner

*Primary Examiner*—Christopher W Fulton
(74) *Attorney, Agent, or Firm*—Robert L. McDowell

(57) ABSTRACT

An actuation device driven by the adjusting motion of a first carriage is provided and, because of the adjusting motion of the first carriage from the first position into the second position, the adjusting motion of a second carriage can be driven from the measurement point to the rest position, and because of the adjusting motion of the first carriage from the second position into the first position, the adjusting motion of the second carriage can be driven from the rest position to the measurement point.

10 Claims, 2 Drawing Sheets

CARRIAGE ARRANGEMENT FOR A MACHINE TOOL

This applications claims the benefit of priority based on German Utility Model Application No. DE 20 2007 012 868.1 filed Sep. 14, 2007.

FIELD OF THE INVENTION

The invention relates to a carriage arrangement for a machine tool having a first carriage which can be adjusted along a first axis of motion, and the adjusting motion of said first carriage can adjust a work piece supported on the first carriage between a first position and a second position, and having a second carriage which can be adjusted along a second axis of motion, and the adjusting motion of said second carriage can adjust a probe supported on the second carriage between a measurement point approximate to the first position of the work piece and a rest position away from the measurement point.

BACKGROUND OF THE INVENTION

Such carriage arrangements are used in particular in machine tools that are used for the finishing of gear wheel blanks. These work pieces require indexing, i.e., recording their rotational position with the probe, to adjust a suitable relative position for the finishing between the work piece and the machine tool, for example a honing cutter. In doing so, generally the gear wheel blank forming the work piece is clamped on a rotationally drivable work spindle, which is supported on the first carriage.

For the indexing, the first carriage, which supports the work piece, is brought into its first position and the probe, which forms the indexing sensor, is advanced very close to the work piece by adjusting the second carriage, which carries the probe, into its measurement position. After the indexing, the second carriage must then be retracted into its rest position away from the measurement point so that the work piece on the first carriage can be transferred into the second position for finishing without said adjusting motion causing a collision between the probe and the work piece, the clamping device that clamps the work piece, or the first carriage which supports the work piece. This in particular also includes the case where the first carriage is first adjusted into its loading position, where the work piece is clamped, and only then is adjusted into its first position. It may be provided that during that time, the second carriage which carries the probe remains in its rest position to avoid a potential collision, for example with an interfering contour of the clamped work piece, and is only then adjusted to its measuring point near the work piece now in the first position.

These adjusting motions are conventionally realized with an electric, pneumatic or hydraulic drive. To ensure that the probe is not in the collision reach, position sensors request the instantaneous position of the second carriage, which carries the probe. The adjusting motion of the first carriage, which carries the work piece, from its first position where the indexing was performed and its second position, where the work piece is brought into engagement with the machine tool, is started only after the position sensors that monitor the second carriage issue a release signal. Thus, retracting the probe from its measuring point and advancing the work piece into its second position occur in a time interval. In a serial sequence of retracting the second carriage and advancing the first carriage, this requires an idle time that corresponds to the total of the time required for the adjusting motion of the second carriage between the measuring point and the rest position and the adjusting motion of the first carriage between the first and the second position.

An object to be attained by the invention is to develop a carriage arrangement of the type described above in such a way as to shorten said idle times.

SUMMARY OF THE INVENTION

In accordance with the invention, this object is attained in that an actuation device driven by the adjusting motion of the first carriage is provided and, because of the adjusting motion of the first carriage from the first position into the second position, the adjusting motion of the second carriage can be driven from the measurement point to the rest position, and because of the adjusting motion of the first carriage from the second position into the first position, the adjusting motion of the second carriage can be driven from the rest position to the measurement point.

DETAILED DESCRIPTION OF THE INVENTION

Figure 1:
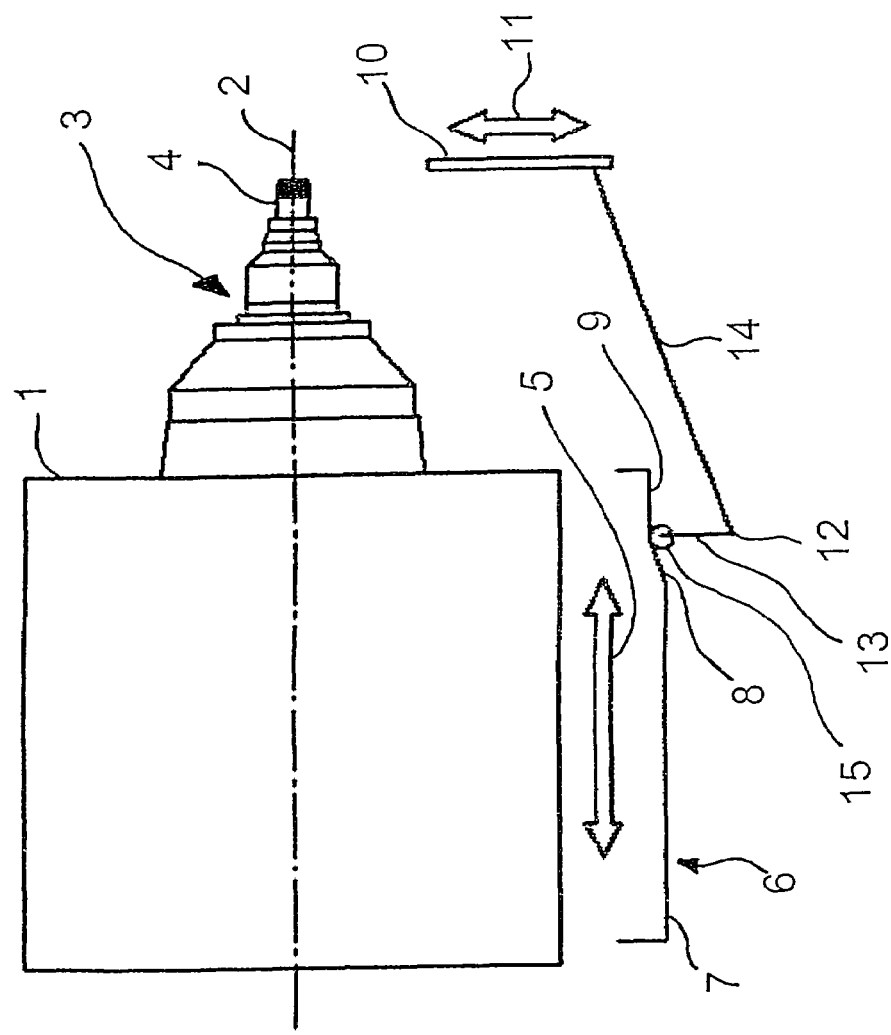
FIG. 1 presents a schematic representation of a first embodiment of the invention.

The present invention will be discussed with reference to the drawings which are intended to represent the invention by way of example only.

With the solution in accordance with the invention, the process of adjusting the probe between its measurement point and its rest position and the process of adjusting the work piece between its first and its second position is performed in parallel. The actuation device in accordance with the invention causes a mechanical compulsive coupling of the adjusting motions of both carriages. In that way the retracting motion of the second carriage that supports the probe is compulsively controlled by the advancing motion of the first carriage that carries the work piece in such a way that with the advancing motion of the first carriage, the second carriage is inevitably retracted from the collision reach.

The invention is applicable in particular in the instance where the first axis of motion and the second axis of motion are arranged linear and orthogonal relative to one another. In that way, the actuation device transforms the linear adjusting motion of the first carriage into a relative orthogonal lateral adjusting motion of the second carriage. For example, the work piece is clamped on a work spindle that is supported on the first carriage and can be rotationally driven, and the spindle axis of said work spindle is arranged parallel to the first axis of motion. In an advancing motion of the work piece, the second carriage that carries the probe then backs away laterally orthogonal to the spindle axis.

In one embodiment, it is provided that the actuation device has a curved path attached to the first carriage and a lever arrangement having a first lever arm, a second lever arm and a pivot axis that is stationary relative to the two carriages, and because of the adjusting motion of the first carriage, the first lever arm of said lever arrangement is pivoted from the curved path, and the second lever arm then therefore drives the adjusting motion of the second carriage. Because of the position of the curved path, which changes according to the adjusting motion of the first carriage relative to the stationary pivot axis of the lever arrangement, the first lever arm is pivoted correspondingly, and the second lever arm converts said pivot motion into a corresponding drive motion for the second carriage. If the first axis of motion is linear, the curved path, for example, may have two path sections that are parallel to the first axis of motion, but are arranged in spaced intervals from the same, with said sections being connected by a ramp-shaped path section. In that case, the two path sections parallel to the first axis of motion determine the two end positions of the pivot motion of the first lever arm, whereas the action of the ramp-shaped path section causes the pivot motion between these two end positions.

The action of the curved path is advantageously transmitted to the first lever arm in that the first lever arm has a roller that is rotatably mounted thereon and rolls off on the curved path. The curved path can be developed such, for example, that it represents a restricted guidance for the roller between two matching uniform radial cams. Another, simpler alternative, on the other hand, is to keep the roller in engagement with the curved path by a spring that generates a torque that acts around the pivot axis. Furthermore, it may be advantageous for the guide function of the curved path to provide a plurality of rollers rather than only one roller.

Depending on the structural requirements of the machine tool, the spatial alignment of the pivot axis of the lever arrangement can largely be selected freely and is subject only to the limitation that it must be possible to derive, from the pivot motion of the second lever arm, a motion component that acts along the second axis of motion. In this scope, the pivot axis may be arranged orthogonal to the first and second axis of motion. On the other hand, a useful alternative may be to provide that the pivot axis is arranged parallel to the first axis of motion.

Likewise, the planes on which the pivot motion of the two lever arms occurs can also be selected optionally so as to allow an adaptation to the respective structural conditions of the machine tool. In particular, a useful embodiment is characterized in that the first and the second lever arm are spaced apart in the direction of the pivot axis.

A first embodiment shown in FIG. 1 shows a schematic representation of a first carriage 1 and a work spindle 3 arranged thereon, which can be rotatably driven around a spindle axis 2, with the one axial end of said work spindle having a clamping device 4 for a work piece, for example in form of a gear blank or a toothed shaft blank. The first carriage 1 can be adjusted along a linear first axis of motion between a first position and a second position. A double arrow 5 indicates the adjusting motion along the first axis of motion parallel to the spindle axis 2.

Attached to the first carriage 1 is a curved path 6 (schematically indicated), which has a first path section 7 parallel to the first axis of motion, a ramp-shaped path section 8 connecting thereto and tilted toward the first axis of motion, and a second path section 9 connected thereto parallel to the first axis of motion. The distance between the second path section 9 and the spindle axis 2 is less than the distance between the first path section 7 and the spindle axis 2.

A schematically indicated second carriage 10 to support a probe (not shown) can be adjusted along a linear second axis of motion orthogonal to the first axis of motion between a measuring point and a rest position away from the measuring point. A double arrow 11 indicates the adjusting motion of the second carriage 10 along the second axis of motion.

A lever arrangement, which can pivot around an orthogonal pivot axis 12 relative to the first and second axis of motion, has a first lever arm 13 and a second lever arm 14. The first lever arm 13 runs from the pivot axis 12, which is stationary relative to the first carriage 1 and the second carriage 10, in the direction of the curved path 6 and has on its end pointing to the curved path 6 a rotatably mounted roller 15, with the axis of rotation of said roller running parallel to the pivot axis 12. The roller 15 is held to bear against the curved path 6 with suitable means, for example a spring (not shown), which loads the lever arrangement with a torque power clockwise relative to the pivot axis 12.

The second lever arm 14 runs from the pivot axis 12 to the second carriage 10 and is hinged thereto so that it follows a pivot motion of the second lever arm 14 by an adjusting motion along the double arrow 11.

In FIG. 1, the first carriage 1 is in its first position, with a gear blank to be machined (not shown) being clamped on the clamping device 4. The indexing sensor that is supported on the second carriage 10 and constitutes the probe (not shown) is at its measuring point in the proximity of the work piece, where the indexing process is performed. After the indexing process is completed, the first carriage 1 is adjusted by its motion drive (not shown) along the first axis of motion in the direction of the second position, which is farther to the right relative to the first position shown in FIG. 1. As a result the roller 15, which was initially bearing against the second path section 9 of the curved path 6, runs onto the ramp-shaped path section 8, which moves toward the right in FIG. 1. As a result, the first lever arm 13 is pivoted around the pivot axis 12 clockwise, and the second carriage 10 is retracted relative to the spindle axis 2 by the adjusting motion of the second lever arm 14, which corresponds to the transmission ratio of the lever arrangement, until it has reached the defined rest position when the roller 15 comes to bear against the connecting first path section 7 after it has run through the ramp-shaped path section 8. In said rest position, the second carriage 10 with the probe is away from the spindle axis 2 far enough to rule out a collision with elements moving to the right because of the adjusting motion 5 of the first carriage 1.

Figure 2:
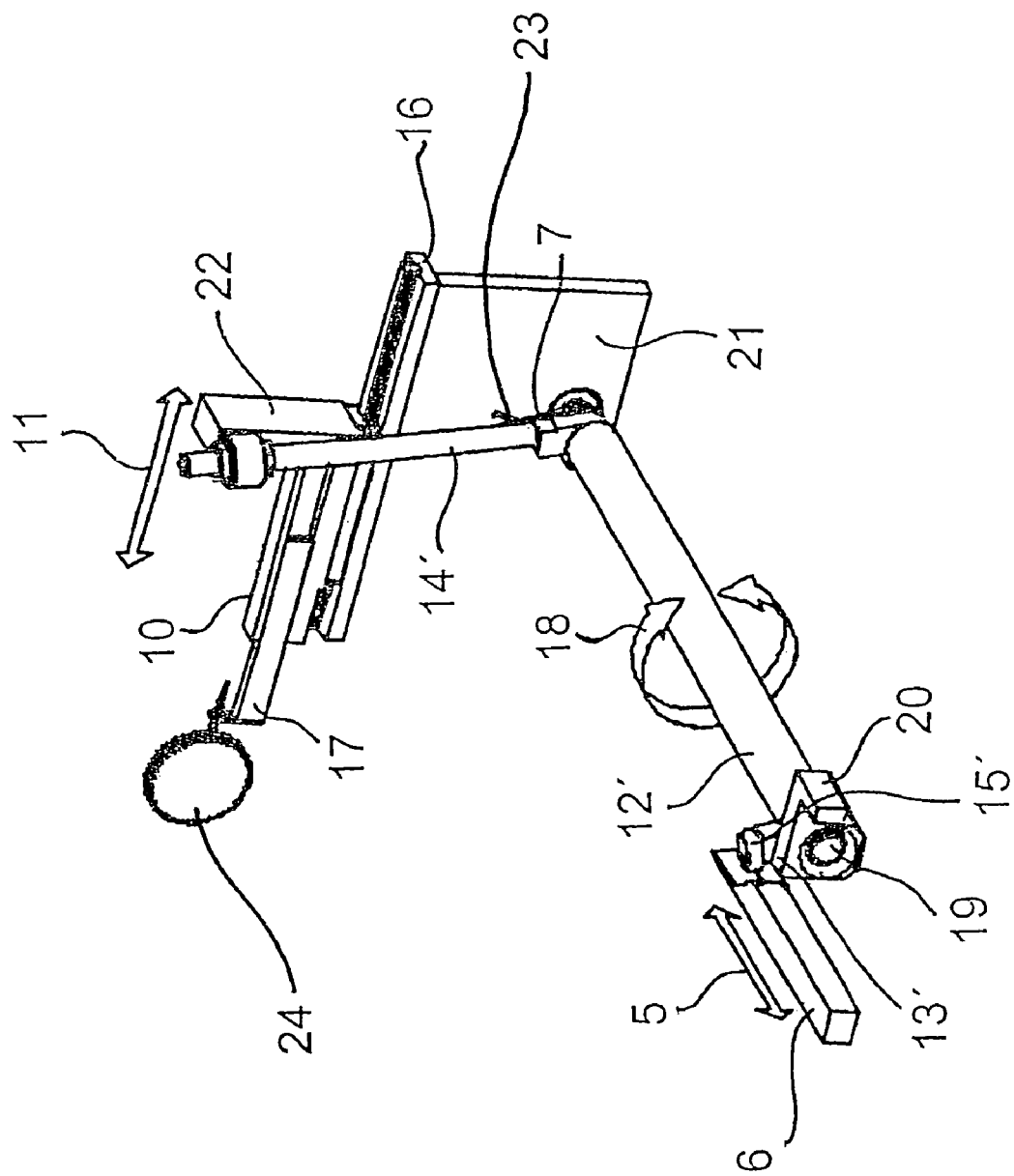
FIG. 2 illustrates a detailed partial representation of a second inventive embodiment.

A second embodiment shown in FIG. 2 also has the development explained in FIG. 1 using the reference symbols 1 to 11. However, FIG. 2 only shows the curved path 6 that follows the adjusting motion 5 of the first carriage 1. The representation of the second carriage 10 is supplemented in FIG. 2 relative to FIG. 1 by the representation of its stationary guide track 16, which guides it according to its adjusting motion 11 along the second axis of motion. Furthermore, FIG. 2 additionally indicates the holder 17 of the probe at the second carriage 10 and the work piece 24.

The difference to the embodiment shown in FIG. 1 is essentially that the pivot axis 12' is arranged parallel to the first axis of motion. The pivot motion around the pivot axis 12' is shown by a double arrow 18. The rod-shaped component that forms the pivot axis 12' is rotatably mounted in a stationary bearing 20 at its axial end 19 pointing to the curved path 6, and at its opposite axial end it is rotatably mounted] in a stationary bearing plate 21 that supports the guide track 16. At the axial end pointing to the curved path 6, the radially running first lever arm 13' is arranged, and at the free end of said lever arm, the roller 15', which is in engagement with the curved path 6, is rotatably mounted.

The second lever arm 14' runs from the axial end of the rod-shaped component that forms of the pivot axis 12' opposite the axial end 19 radially up to an element 22 fastened at the second carriage 10, in which a orthogonal guide slot relative to the second axis of motion is formed. In said guide slot, a guide bolt fixed at the second lever arm 14' is guided. The guide slot takes up the orthogonal motion component of the pivot motion of the second lever arm 14' relative to the second motion path, whereas the parallel component of this pivot motion, which is parallel to the second motion axis, causes a corresponding adjusting motion of the second carriage 10. In a functional aspect, the lever arrangement outlined in FIG. 2 achieves the same results as was explained for the first embodiment shown in FIG. 1.

FIG. 1 also shows the torsion spring 23 centered around the pivot axis 12', with one end of said torsion spring being supported at the second lever arm 14' and the other end of said torsion spring being supported at the stationary bearing plate 21 so that it exerts a torque that keeps the roller 15' in contact with the curved path 6.

LIST OF REFERENCE SYMBOLS

1 First carriage
2 Spindle axis
3 Working spindle
4 Clamping device
5 Double arrow/adjusting motion
6 Curved path
7 First path section
8 Ramp-shaped path section
9 Second path section
10 Second carriage
11 Double arrow/adjusting motion
12, 12' Pivot axis
13, 13' First lever arm
14, 14' Second lever arm
15, 15' Roller
16 Guide track
17 Fastening device
18 Double arrow/pivot motion
19 Axial end
20 Stationary bearing
21 Stationary bearing plate
22 Element
23 Torsion spring
24 Work piece While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. Carriage arrangement for a machine tool having a first carriage (1) which can be adjusted along a first axis of motion, and the adjusting motion (5) of said first carriage can adjust a work piece supported on the first carriage (1) between a first position and a second position, and having a second carriage (10) which can be adjusted along a second axis of motion, and the adjusting motion (11) of said second carriage can adjust a probe supported on the second carriage (10) between a measurement point approximate to the first position of the work piece and a rest position away from the measurement point, wherein an actuation device (6, 13, 13', 14, 14') driven by the adjusting motion of the first carriage (1) is provided and, because of the adjusting motion (5) of the first carriage (1) from the first position into the second position, the adjusting motion (11) of the second carriage (10) can be driven from the measurement point to the rest position, and because of the adjusting motion (5) of the first carriage (1) from the second position into the first position, the adjusting motion (11) of the second carriage (10) can be driven from the rest position to the measurement point.

2. Carriage arrangement in accordance with claim 1 wherein the first axis of motion and the second axis of motion are linear and orthogonal relative to one another.

3. Carriage arrangement in accordance with claim 2 wherein the actuation device has a defined curved path (6) attached to the first carriage (1), and a lever arrangement comprised of a first lever arm (13, 13'), a second lever arm (14, 14') and a pivot axis (12, 13') that is stationary relative to both carriages (1, 10), with the first lever arm (13, 13') of said lever arrangement being pivoted from the curved path (6) because of the adjusting movement (5) of the first carriage (1) and the second lever arm (14, 14') of said lever arrangement in this way driving the adjusting motion (11) of the second carriage (10).

4. Carriage arrangement in accordance with claim 3 wherein the first lever arm (13, 13') has a roller (15, 15') rotationally mounted thereon which rolls off on the curved path (6).

5. Carriage arrangement in accordance with claim 4 wherein the roller (15, 15') is held in engagement with the curved path (6) by a spring (23) generating torque that acts around the pivot axis (12, 12').

6. Carriage arrangement in accordance with claim 3 wherein the pivot axis (12) is arranged orthogonally relative to the first and second axis of motion.

7. Carriage arrangement in accordance with claim 3 wherein the pivot axis (12') is arranged parallel to the first axis of motion.

8. Carriage arrangement in accordance with claim 3 wherein the first (13') and the second (14') lever arm are spaced apart in the direction of the pivot axis (12').

9. Carriage arrangement in accordance with claim 1 wherein the work piece is clamped on a work spindle (3) supported on the first carriage (1).

10. Carriage arrangement in accordance with claim 1 wherein the probe is an indexing sensor that records the rotary position of the work piece.

* * * * *